(12) United States Patent
Kim et al.

(10) Patent No.: US 10,967,347 B2
(45) Date of Patent: Apr. 6, 2021

(54) CHUTE TYPE MONOMER DISPENSER

(71) Applicant: LG Chem, Ltd., Seoul (KR)

(72) Inventors: Sunyoung Kim, Daejeon (KR); Young Cheol Jung, Daejeon (KR); Ye Hoon Im, Daejeon (KR); Youngsoo Song, Daejeon (KR); Kyunghoon Min, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/754,628

(22) PCT Filed: Oct. 12, 2018

(86) PCT No.: PCT/KR2018/012054
§ 371 (c)(1),
(2) Date: Apr. 8, 2020

(87) PCT Pub. No.: WO2019/074328
PCT Pub. Date: Apr. 18, 2019

(65) Prior Publication Data
US 2021/0001295 A1    Jan. 7, 2021

(30) Foreign Application Priority Data

Oct. 12, 2017   (KR) .................. 10-2017-0132738

(51) Int. Cl.
*B01J 4/00*      (2006.01)
*B01J 19/22*     (2006.01)
(Continued)

(52) U.S. Cl.
CPC ............... *B01J 4/005* (2013.01); *B01J 4/002* (2013.01); *B01J 19/006* (2013.01); *B01J 19/06* (2013.01);
(Continued)

(58) Field of Classification Search
CPC ... B01J 19/22; B01J 19/26; B01J 19/06; B01J 19/006; B01J 4/005; B01J 4/002; B01J 4/00; C08F 2/01; B05B 15/50
See application file for complete search history.

(56) References Cited

U.S. PATENT DOCUMENTS 4,389,357 A    6/1983   Chu et al.
4,446,261 A    5/1984   Yamasaki et al.
(Continued)

FOREIGN PATENT DOCUMENTS

CN    101884900 A    11/2010
CN    106861558 A     6/2017
(Continued)

OTHER PUBLICATIONS

Search report from International Application No. PCT/KR2018/012054, dated Apr. 4, 2019.
(Continued)

*Primary Examiner* — Lessanework Seifu
(74) *Attorney, Agent, or Firm* — Lerner, David, Littenberg, Krumholz & Mentlik, LLP

(57) ABSTRACT

A chute type monomer dispenser is provided in the present disclosure. The chute type monomer dispenser includes a chute dispenser installed to be slanted in a direction of a polymerization apparatus, the chute dispenser is configured to inject a monomer to the polymerization apparatus through an injection pipe having an injection portion having an opening at an upper portion of the chute dispenser; and an injector configured to inject an initiator and a foaming agent to the injection portion.

7 Claims, 7 Drawing Sheets

(51) Int. Cl.
*B01J 19/06* (2006.01)
*B05B 15/50* (2018.01)
*B01J 19/00* (2006.01)
*B01J 19/26* (2006.01)

(52) U.S. Cl.
CPC ............. *B01J 19/22* (2013.01); *B01J 19/26* (2013.01); *B05B 15/50* (2018.02)

(56) References Cited

U.S. PATENT DOCUMENTS

| | | | |
|---|---|---|---|
| 4,985,518 | A | 1/1991 | Alexander et al. |
| 6,667,372 | B1 | 12/2003 | Miyake et al. |
| 6,951,908 | B2 | 10/2005 | Groos et al. |
| 2004/0010098 | A1 | 1/2004 | Groos et al. |
| 2010/0273942 | A1 | 10/2010 | Funk et al. |
| 2011/0222972 | A1 | 9/2011 | Erceg et al. |
| 2014/0107305 | A1 | 4/2014 | Funk et al. |
| 2014/0329024 | A1 | 11/2014 | Leem et al. |
| 2016/0001315 | A1 | 1/2016 | Boesch et al. |

FOREIGN PATENT DOCUMENTS

| | | |
|---|---|---|
| EP | 1097946 A2 | 5/2001 |
| EP | 2858213 A2 | 5/2013 |
| EP | 2787012 A1 | 10/2014 |
| EP | 2808077 A1 | 12/2014 |
| EP | 2808078 A1 | 12/2014 |
| JP | S56161408 A | 12/1981 |
| JP | S57158209 A | 9/1982 |
| JP | S57198714 A | 12/1982 |
| JP | 2004520458 A | 7/2004 |
| JP | 2011506695 A | 3/2011 |
| JP | 4679683 B2 | 4/2011 |
| JP | 5502749 B2 | 5/2014 |
| JP | 2014133886 A | 7/2014 |
| KR | 20110138962 A | 12/2011 |
| KR | 101126678 B1 | 3/2012 |
| KR | 20130115810 A | 10/2013 |
| KR | 20150133142 A | 11/2015 |
| KR | 101659347 B1 | 9/2016 |
| WO | 2011162544 A2 | 12/2011 |

OTHER PUBLICATIONS

Extended European Search Report including Written Opinion for EP18865906.4 dated Jul. 10, 2020; 10 pages.

CHUTE TYPE MONOMER DISPENSER

CROSS-REFERENCE TO RELATED APPLICATION

The present application is a national phase entry under 35 U.S.C. § 371 of International Application No. PCT/KR2018/012054 which claims priority from Korean Patent Application No. 10-2017-0132738 filed Oct. 12, 2017 with the Korean Intellectual Property Office, the disclosures of which are incorporated herein by reference in their entirety.

TECHNICAL FIELD

The present invention relates to a chute type monomer dispenser capable of feeding a monomer without foreign substances.

BACKGROUND ART

A super absorbent polymer (SAP) is a synthetic polymer material having a function of absorbing about 500 to 1,000 times its own weight of moisture. Various manufacturers have called it with different names such as a super absorbency material (SAM) and an absorbent gel material (AGM).

The super absorbent polymer started to be practically applied in sanitary products and is currently widely used for water retaining soil for gardening, water stop materials for civil engineering and construction, sheets for raising seedling, fresh-keeping agents for food distribution fields, and materials for poultices, as well as hygiene products such as disposable diapers for children.

As a method for preparing a super absorbent polymer, a reverse phase suspension polymerization method, an aqueous solution polymerization method, and the like have been known.

For example, the reverse phase suspension polymerization method is disclosed in Japanese Patent Laid-Open Publication Nos. S56-161408, S57-158209, S57-198714, and the like. As the aqueous solution polymerization method, a thermal polymerization method of polymerizing a hydrous gel phase polymer while fracturing and cooling the hydrous gel phase polymer in a kneader equipped with a plurality of shafts, a photo-polymerization method of irradiating an aqueous solution having a high concentration with UV rays and the like on a belt to perform polymerization and drying at the same time, and the like have been known.

Meanwhile, in order to obtain a hydrous gel phase polymer having more excellent physical properties, a method using a belt type SAP polymerization apparatus has been currently widely used.

That is, a monomer is fed using a cylindrical dispenser including the belt type SAP polymerization apparatus with a vertical pipe to convey the monomer at a uniform speed and thickness.

Such a cylindrical dispenser includes a main channel through which a monomer is moved and a plurality of discharge channels branched from the main channel and through which the monomer is discharged. Here, in a process in which the monomer is discharged, the monomer may be fed to the belt type SAP polymerization apparatus in a state in which an initiator and a foaming agent are injected together and mixed with the monomer.

However, in the cylindrical dispenser as described above, during the process in which the monomer is discharged through the discharge channel by passing through the main channel, a dead zone where a flow of the monomer is blocked is formed therein to often cause generation of foreign substances. Accordingly, an outlet of the cylindrical dispenser is blocked by the foreign substances, resulting in deterioration of working efficiency and damage of a belt of the belt type SAP polymerization apparatus.

DISCLOSURE

Technical Problem

The present invention has been made in an effort to provide a chute type monomer dispenser having advantages of preventing a belt of a polymerization apparatus from being damaged due to foreign substances by preventing a formation of a dead zone where a flow of a monomer is blocked during feeding the monomer.

Technical Solution

An exemplary embodiment of the present invention provides a chute type monomer dispenser including: a chute dispenser installed to be slanted in a direction of a polymerization apparatus, the chute dispenser configured to inject a monomer to the polymerization apparatus through an injection pipe, the injection pipe having an injection portion having an opening at an upper portion of the chute dispenser; and an injector configured to inject an initiator and a foaming agent to the injection portion.

The chute dispenser may include a dispenser body on which the monomer is moved in the direction of the polymerization apparatus, and guide portions formed at sides of the dispenser body and guiding the movement of the monomer.

The dispenser body may have a slanted movement portion on which the monomer, the initiator, and the foaming agent are moved in the direction of the polymerization apparatus.

The guide portions may include a first guide protrusion protruding at a first edge of a first side of the slanted movement portion; and a second guide protrusion protruding at a second edge of a second side of the slanted movement portion, the second side being opposed to the first side.

The slanted movement portion may be formed in a fan shape from a portion where the first guide protrusion and the second guide protrusion are connected to each other.

The injection pipe may have an opened fan-shaped portion where the monomer is discharged to the injection portion.

The injector may inject the initiator and the foaming agent to a portion of the injection portion of the chute dispenser in a spray manner.

Advantageous Effect

According to an exemplary embodiment of the present invention, a time required for a monomer to move from an injected position to a discharged position and a flow rate of the monomer are further increased, such that the monomer is stably fed without generation of foreign substances, thereby preventing a belt of the polymerization apparatus from being damaged due to the foreign substances.

MODE FOR INVENTION

Figure 1:
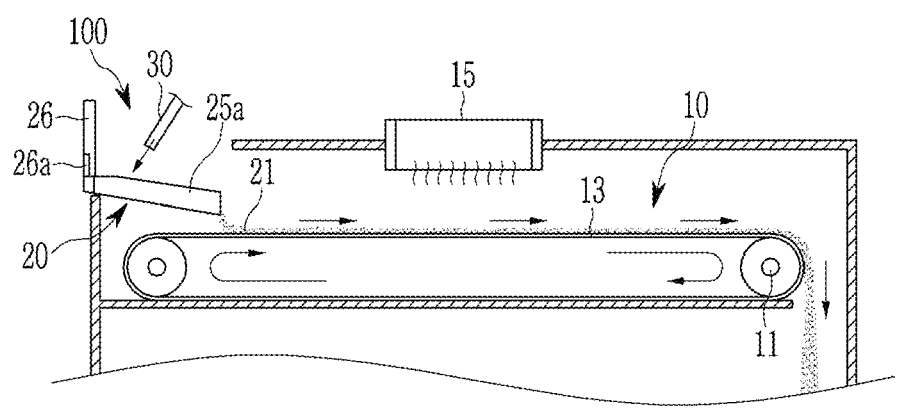
FIG. 1 is a cross-sectional view schematically illustrating a chute type monomer dispenser according to an exemplary embodiment of the present invention.

Hereinafter, exemplary embodiments of the present invention will be described in detail with reference to the accompanying drawings so that those skilled in the art to which the present invention pertains may easily implement the exemplary embodiments. However, the present invention may be implemented in various different forms and is not limited to the embodiments described herein.

In the drawings, portions irrelevant to the description are omitted for clearly describing the present invention and the same or similar components are denoted by the same reference numerals throughout the specification.

Throughout the specification, when any one part is referred to as being "connected to" another part, it means that any one part and another part are "directly connected to" each other or are "indirectly connected to" each other with the other member interposed therebetween. In addition, unless explicitly described to the contrary, "comprising" any components will be understood to imply the inclusion of other components rather than the exclusion of any other components.

Throughout the specification, it will be understood that when an element such as a layer, a film, a region, or a substrate is referred to as being positioned "on" another element, the element may be directly positioned on another element or an intervening element may also be present between the two elements. In addition, the term "above" or "on" means positioning on or below the object portion, but does not essentially mean positioning on the upper side of the object portion based on a gravity direction.

Figure 2:
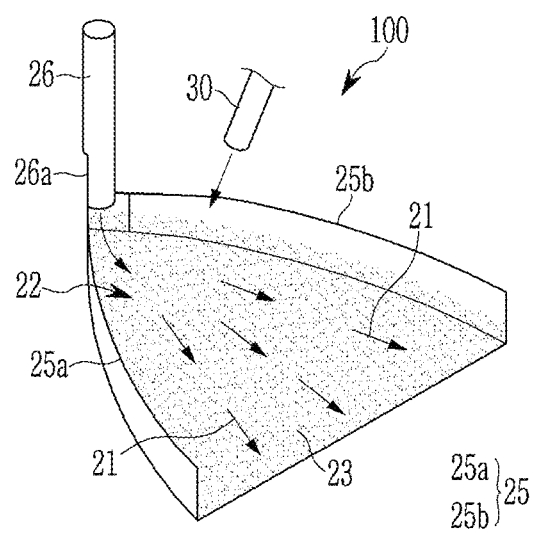
FIG. 2 is a perspective view schematically illustrating an operation state of a chute dispenser and an injector of the chute type monomer dispenser according to an exemplary embodiment of the present invention.
Figure 3:
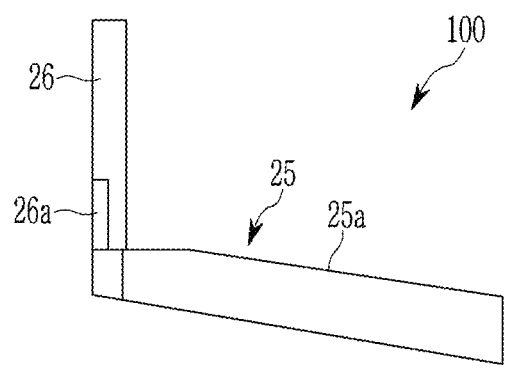
FIG. 3 is a side view of the chute type monomer dispenser of FIG. 2.

FIG. 1 is a cross-sectional view schematically illustrating a chute type monomer dispenser according to an exemplary embodiment of the present invention, FIG. 2 is a perspective view schematically illustrating an operation state of a chute dispenser and an injector of the chute type monomer dispenser according to an exemplary embodiment of the present invention, and FIG. 3 is a side view of the chute type monomer dispenser of FIG. 2.

As illustrated in FIGS. 1 to 3, a chute type monomer dispenser 100 according to an exemplary embodiment of the present invention includes a chute dispenser 20 installed to be slanted in a direction of a polymerization space inside a polymerization apparatus 10, injecting a monomer into the polymerization space through an injection pipe 26, and having an injection portion 22 formed at an upper portion of the chute dispenser 20, and an injector 30 injecting an initiator and a foaming agent to the injection portion 22.

The polymerization apparatus 10 is for preparing a super absorbent polymer (SAP), and a belt type polymerization apparatus is described in the present exemplary embodiment by way of example.

That is, as illustrated in FIG. 1, the polymerization apparatus 10 may include a plurality of rotation shafts 11, a conveyer belt 13 movably installed in a certain direction between the rotation shafts 11, and a polymerization energy feeding unit 15 feeding polymerization energy.

For a polymerization reaction, the monomer, the initiator, and the foaming agent may be injected to the polymerization apparatus 10.

The monomer 21 may be injected to the polymerization apparatus 10 by the chute dispenser 20.

The chute dispenser 20 is installed to be slanted in the direction of the polymerization apparatus and may inject the monomer to the polymerization apparatus.

More specifically, the chute dispenser 20 has an injection portion 22 having an opening at the upper portion of the chute dispenser 20, and the monomer 21 may be fed through the injection portion 22 and be injected into the polymerization apparatus 10.

The monomer 21 may be fed into the injection portion 22 of the chute dispenser 20 through the injection pipe 26.

The chute dispenser 20 may include a dispenser body 23 on which the monomer 21 is moved in the direction of the polymerization apparatus 10, and guide portions 25 formed at sides of the dispenser body 23 and guiding the movement of the monomer 21.

The dispenser body 23 is installed to be slanted in the direction of the polymerization apparatus 10, and may be installed so that the monomer 21 is injected into the polymerization apparatus 10 by its own weight.

The dispenser body 23 may have a slanted movement portion on which the monomer 21 is moved. Hereinafter, the dispenser body and the slanted movement portion are denoted by the same reference numeral.

The slanted movement portion 23 is formed at the upper portion of the dispenser body 23 and is formed in a fan-shaped plane with a long length in the present exemplary embodiment so that the monomer 21 is moved in the direction of the polymerization apparatus 10 by its own weight.

As such, the slanted movement portion 23 is formed in the fan-shaped plane, such that the monomer may be fed to the polymerization apparatus 10 while maintaining a uniform thickness, in a process in which the monomer 21 is discharged in the direction of the polymerization apparatus 10.

The dispenser body 23 may have guide portions 25 guiding the movement of the monomer 21.

The guide portions 25 may include a first guide protrusion 25a protruding at an edge of a first side of the slanted movement portion 23 and a second guide protrusion 25b protruding at an edge of a second side of the slanted movement portion 23, the second side being opposed to the first side.

The first guide protrusion 25a protrudes at the edge of the first side of the slanted movement portion 23, and may prevent the monomer 21 moved along the slanted movement portion 23 from escaping from the first side thereof to the outside.

The first guide protrusion 25a may protrude at the first side of the slanted movement portion 23, while being in a slanted state.

That is, the first guide protrusion 25a may protrude in a slanted state so as to have a maximum height at a portion at which the monomer 21 is injected and a minimum height at a portion at which the monomer 21 is discharged, depending on a slant angle of the slanted movement portion 23.

The second guide protrusion 25b may protrude at the second side of the slanted movement portion 23, while being in a slanted state.

That is, the second guide protrusion 25b is formed in the same size and shape as those of the first guide protrusion 25a, and may protrude at the second side opposed to the first side of the slanted movement portion 23.

The second guide protrusion 25b may protrude at the second side of the slanted movement portion 23, while being in a slanted state.

That is, the second guide protrusion 25b may protrude in a slanted state so as to have a maximum height at a portion at which the monomer 21 is injected and a minimum height at a portion at which the monomer 21 is discharged, depending on a slant angle of the slanted movement portion 23.

As such, the second guide protrusion 25b protrudes at the second side of the slanted movement portion 23, and may prevent the monomer 21 from escaping from the second side of the slanted movement portion 23 to the outside in a process in which the monomer is injected.

The first guide protrusion 25a and the second guide protrusion 25b described above each are formed in a protruding state at the edges of the both sides of the slanted movement portion 23 formed in a fan shape, such that the monomer 21 discharged along the slanted movement portion 23 may be guided to be stably injected to the polymerization apparatus 10 while maintaining a uniform thickness.

Figure 4:
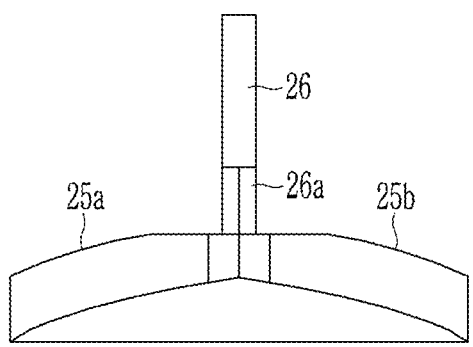
FIG. 4 is a view schematically illustrating a state in which an injection pipe of the chute type monomer dispenser of FIG. 3 is installed.
Figure 5:
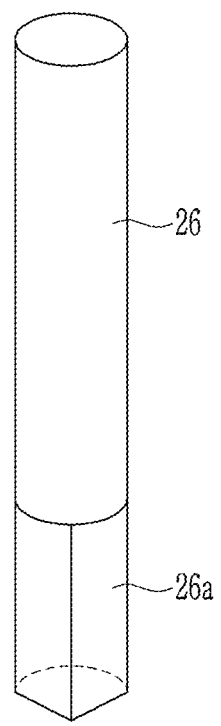
FIG. 5 is a perspective view schematically illustrating the injection pipe according to an exemplary embodiment of the present invention.

FIG. 4 is a view schematically illustrating a state in which an injection pipe of the chute type monomer dispenser of FIG. 3 is installed, and FIG. 5 is a perspective view schematically illustrating the injection pipe according to an exemplary embodiment of the present invention.

As illustrated in FIGS. 4 and 5, the monomer 21 may be injected into the injection portion 22 of the chute dispenser 20 through the injection pipe 26.

The injection pipe 26 may have an opened fan-shaped portion 26a where the monomer 21 is discharged to the injection portion 22. More specifically, the injection pipe 26 may be installed in a state in which one side of an end of the injection pipe 26 is in contact with an inner surface of the first guide protrusion 25a and the other side of the end of the injection pipe 26 is in contact with an inner surface of the second guide protrusion 25b.

Accordingly, the monomer 21 injected through the injection pipe 26 may be stably moved along the slanted movement portion 23 without a dead zone where a flow of the monomer is blocked.

Meanwhile, an initiator and a foaming agent may be injected to the chute dispenser 20 by the injector 30.

The injector 30 installed outside the chute dispenser 20 may be installed to inject the initiator and the foaming agent toward the injection portion 22 of the chute dispenser 20.

That is, the injector 30 may inject the initiator and the foaming agent toward the injection portion 22 from the outside of the chute dispenser 20 in a spray manner.

The injector 30 injects the initiator and the foaming agent in a spray manner in a state in which the injector 30 is spaced apart from an upper side of the chute dispenser 20 at a predetermined distance to feed the initiator and the foaming agent to the chute dispenser 20. One injector 30 may be installed above the chute dispenser 20.

Although the case in which one injector 30 is installed outside the chute dispenser 20 is described by way of example, a plurality of injectors 30 may be installed depending on injection amounts and injection positions of the initiator and the foaming agent.

As described above, the chute type monomer dispenser 100 of the present exemplary embodiment may uniformly distribute and feed the monomer 21 fed through the vertical type injection pipe 26 to the belt type polymerization apparatus 10.

Here, the chute dispenser 20 is formed in an open type, and the initiator and the foaming agent may be fed to the open type chute dispenser 20 by the injector 30 in a spray manner.

Accordingly, the monomer, the initiator, and the foaming agent fed to the chute dispenser 20 may be fed to the polymerization apparatus while turbulence for mixing is sufficiently formed.

In this process, the chute dispenser 20 has the opened injection portion 22, such that the monomer, the initiator, and the foaming agent may be efficiently fed without a dead zone where a flow is blocked.

Figure 6:
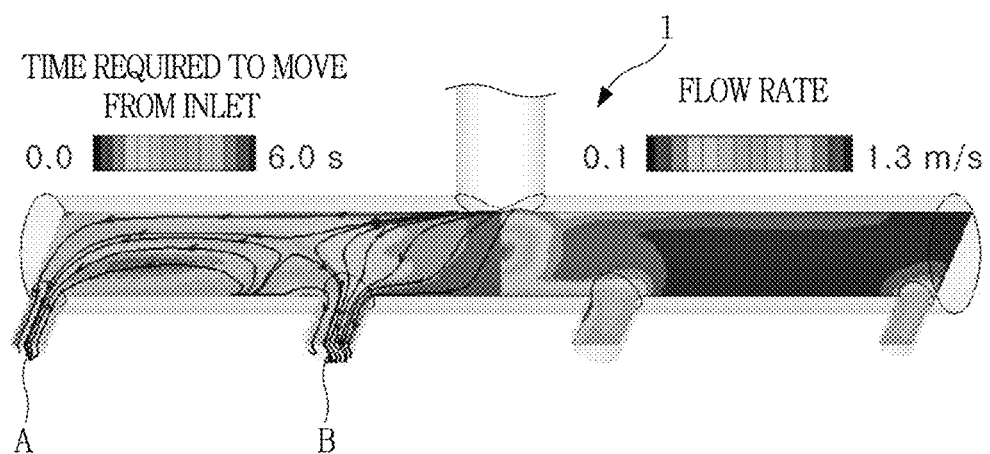
FIG. 6 is a view schematically illustrating a state in which a dead zone is formed in a cylindrical dispenser according to the related art.
Figure 7:
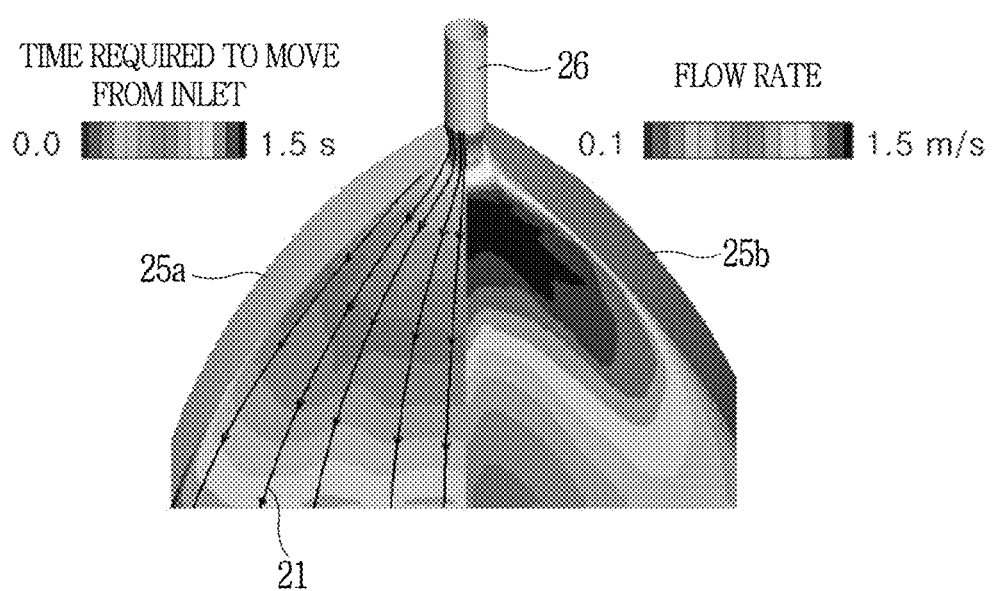
FIG. 7 is a view schematically illustrating a state in which a dead zone is not formed in the chute type monomer dispenser according to an exemplary embodiment of the present invention.

FIG. 6 is a view schematically illustrating a state in which a dead zone is formed in a cylindrical dispenser according to the related art, and FIG. 7 is a view schematically illustrating a state in which a dead zone is not formed in the chute type monomer dispenser according to an exemplary embodiment of the present invention.

As illustrated in FIG. 6, it can be confirmed that in a cylindrical dispenser 1 according to the related art, a wide dead zone is formed between a first outlet A and a second outlet B that are formed between an edge and an inlet of the cylindrical dispenser 1.

As illustrated in FIG. 7, it can be confirmed that in the chute type monomer dispenser according to an exemplary embodiment of the present invention, a time required for a monomer to move from an injected position to a discharged position and a flow rate of the monomer are further increased, such that the monomer is stably fed without generation of foreign substances.

Although the preferred exemplary embodiments of the present invention have been described above, the present invention is not limited thereto, and various modifications can be made and carried out within the scope of the claims and the detailed description of the invention, and also belong to the scope of the invention.

DESCRIPTION OF SYMBOLS

| | |
|---|---|
| 10 . . . polymerization apparatus | 11 . . . rotation shaft |
| 13 . . . conveyor belt | 15 . . . polymerization energy feeding unit |
| 20 . . . chute dispenser | 21 . . . monomer |
| 22 . . . injection portion | 23 . . . dispenser body |
| 25 . . . guide portion | 25a . . . first guide protrusion |
| 25b . . . second guide protrusion | 26 . . . injection pipe |
| 30 . . . injector | 100 . . . chute type monomer dispenser |

The invention claimed is:

1. A chute type monomer dispenser comprising:
   a chute dispenser installed to be slanted in a direction of a polymerization apparatus, the chute dispenser configured to inject a monomer to the polymerization apparatus through an injection pipe;

an injection portion having an opening at an upper portion of the chute dispenser; and an injector configured to inject an initiator and a foaming agent to the injection portion.

2. The chute type monomer dispenser of claim 1, wherein the chute dispenser further comprises:

a dispenser body on which the monomer is moved in the direction of the polymerization apparatus; and guide portions formed at sides of the dispenser body configured to guild a movement of the monomer.

3. The chute type monomer dispenser of claim 2, wherein the dispenser body has a slanted movement portion on which the monomer, the initiator, and the foaming agent are moved in the direction of the polymerization apparatus.

4. The chute type monomer dispenser of claim 3, wherein the guide portions further comprises:

a first guide protrusion protruding at a first edge of a first side of the slanted movement portion; and a second guide protrusion protruding at a second edge of a second side of the slanted movement portion, the second side being opposed to the first side.

5. The chute type monomer dispenser of claim 4, wherein the slanted movement portion is formed in a fan shape from a portion where the first guide protrusion and the second guide protrusion are connected to each other.

6. The chute type monomer dispenser of claim 1, wherein the injection pipe has an opened fan-shaped portion where the monomer is discharged to the injection portion.

7. The chute type monomer dispenser of claim 1, wherein the injector injects the initiator and the foaming agent to a portion of the injection portion of the chute dispenser in a spray manner.

* * * * *